(12) United States Patent
Yan

(10) Patent No.: US 11,599,338 B2
(45) Date of Patent: Mar. 7, 2023

(54) MODEL LOADING METHOD AND APPARATUS FOR HEAD-MOUNTED DISPLAY DEVICE, AND HEAD-MOUNTED DISPLAY DEVICE

(71) Applicant: Qingdao Pico Technology Co., Ltd., Qingdao (CN)

(72) Inventor: Xinyang Yan, Beijing (CN)

(73) Assignee: QINGDAO PICO TECHNOLOGY CO., LTD., Shandong (CN)

( * ) Notice: Subject to any disclaimer, the term of this patent is extended or adjusted under 35 U.S.C. 154(b) by 0 days.

(21) Appl. No.: 17/817,903

(22) Filed: Aug. 5, 2022

(65) Prior Publication Data
US 2022/0405067 A1    Dec. 22, 2022

Related U.S. Application Data

(63) Continuation of application No. PCT/CN2022/099501, filed on Jun. 17, 2022.

(30) Foreign Application Priority Data

Jun. 18, 2021  (CN) .......................... 202110678807.0

(51) Int. Cl.
*G09G 5/00* (2006.01)
*G06F 8/35* (2018.01)
(Continued)

(52) U.S. Cl.
CPC ................ *G06F 8/35* (2013.01); *A63F 13/24* (2014.09); *G06F 3/033* (2013.01); *G06F 9/44505* (2013.01); *G06T 17/00* (2013.01)

(58) Field of Classification Search
CPC ...... G06F 3/012; G06F 3/033; G06F 3/04842; G06F 8/35; G06F 9/44505; G02B 27/017; G02B 2027/0178; A63F 13/24
See application file for complete search history.

(56) References Cited

U.S. PATENT DOCUMENTS 9,384,594 B2 *   7/2016  Maciocci ............... G06T 19/006
10,796,489 B1 * 10/2020  Cordes .................. A63F 13/213
(Continued)

FOREIGN PATENT DOCUMENTS

CN     111562949 A  *  8/2020
CN     111562949 A     8/2020
(Continued)

OTHER PUBLICATIONS

International Search Report in PCT/CN2022/099501, dated Sep. 14, 2022, 4 pages.

*Primary Examiner* — Joe H Cheng
(74) *Attorney, Agent, or Firm* — Arentfox Schiff LLP

(57) ABSTRACT

The present disclosure discloses a model loading method and apparatus for a head-mounted display device and a head-mounted display device. The method includes: obtaining a type of a target handheld device, in which the target handheld device is a handheld device connected to a current application service; determining whether the type of the target handheld device is an existing type in the head-mounted display device; obtaining, in response to the type of the target handheld device being not the existing type in the head-mounted display device, corresponding model resource data based on the type of the target handheld device; and generating, based on the model resource data, a handheld model corresponding to the target handheld device, and loading the handheld model.

18 Claims, 3 Drawing Sheets

(51) Int. Cl.
　　　*G06F 3/033*　　(2013.01)
　　　*A63F 13/24*　　(2014.01)
　　　*G06F 9/445*　　(2018.01)
　　　*G06T 17/00*　　(2006.01)

(56) References Cited

U.S. PATENT DOCUMENTS

| | | | |
|---|---|---|---|
| 10,853,991 B1* | 12/2020 | Yan | G06F 3/011 |
| 2012/0075096 A1 | 3/2012 | Howard et al. | |
| 2014/0364208 A1* | 12/2014 | Perry | A63F 13/31 463/31 |
| 2018/0131788 A1* | 5/2018 | Roberts | H04L 67/1095 |
| 2018/0321737 A1* | 11/2018 | Pahud | G06F 3/0304 |
| 2019/0026071 A1* | 1/2019 | Tamaoki | A63F 13/25 |
| 2019/0250891 A1* | 8/2019 | Kumar | G06K 9/6218 |
| 2019/0370926 A1* | 12/2019 | Hagland | H04L 67/52 |
| 2021/0240343 A1* | 8/2021 | Kobayashi | G06F 3/04886 |

FOREIGN PATENT DOCUMENTS

| | | | |
|---|---|---|---|
| CN | 112036558 A | 12/2020 | |
| CN | 112906803 A | 6/2021 | |
| CN | 113485548 A | 10/2021 | |

\* cited by examiner

MODEL LOADING METHOD AND APPARATUS FOR HEAD-MOUNTED DISPLAY DEVICE, AND HEAD-MOUNTED DISPLAY DEVICE

CROSS-REFERENCE TO RELATED APPLICATIONS

This application is a continuation of International Application No. PCT/CN2022/099501, filed on Jun. 17, 2022, which claims priority to Chinese Patent Application No. 202110678807.0 filed on Jun. 18, 2021 and entitled "MODEL LOADING METHOD AND APPARATUS FOR HEAD-MOUNTED DISPLAY DEVICE, AND HEAD-MOUNTED DISPLAY DEVICE", the entire disclosure of which is incorporated herein by reference.

TECHNICAL FIELD

The present disclosure relates to the field of virtual reality technologies, and more particularly, to a model loading method and apparatus for a head-mounted display device and a head-mounted display device.

BACKGROUND

With the gradual maturation of Virtual Reality (VR) technologies, various head-mounted display devices such as virtual reality helmets and virtual reality glasses have emerged one after another, which can provide users with an immersive virtual reality experience by presenting a virtual reality scene when they play games, watch videos and interact with scenes. Therefore, the presentation of virtual reality scenes is a key factor affecting the virtual reality experience available to users.

At present, during development of a virtual reality application, for the display of a handheld device such as a joystick controller in a virtual scene, a handheld model that may be required is pre-built into a Software Development Kit (SDK), and then a developer uses the handheld model built into the current SDK to develop an application or a game. Once the game or application is developed and uploaded to an application store, it cannot be modified.

However, when users use handheld devices with other shapes and styles, a mismatch occurs between a model in the virtual scene and a handheld device in reality. To match the model in the virtual scene and the handheld device in reality, the developer needs to re-adapt a new SDK, modify a logic of the game or application, and re-upload the game or application to the application store. In this way, it is undoubtedly that development costs will be increased.

SUMMARY

In view of the above problems, a main object of the present disclosure is to provide a model loading method and apparatus for a head-mounted display device and a head-mounted display device, capable of solving an existing technical problem of high costs resulted from loading a new handheld model on a head-mounted display device.

In a first aspect of the present disclosure, a model loading method for a head-mounted display device is provided. The method includes: obtaining a type of a target handheld device, the target handheld device being a handheld device connected to a current application service; determining whether the type of the target handheld device is an existing type in the head-mounted display device; obtaining, in response to the type of the target handheld device being not the existing type in the head-mounted display device, corresponding model resource data based on the type of the target handheld device; and generating, based on the model resource data, a handheld model corresponding to the target handheld device, and loading the handheld model.

Optionally, obtaining the corresponding model resource data based on the type of the target handheld device includes: obtaining a corresponding model file based on the type of the target handheld device, the model file being an OBJ model file; and obtaining, based on the model file, the model resource data corresponding to the type of the target handheld device.

Optionally, obtaining the corresponding model file based on the type of the target handheld device includes: obtaining a Json file, the Json file storing a type of a handheld device and model configuration information corresponding to the type of the handheld device; obtaining, from the Json file, model configuration information corresponding to the type of the target handheld device; and obtaining, based on the model configuration information, the model file corresponding to the type of the target handheld device.

Optionally, the model configuration information includes a storage path of a model resource. Obtaining, based on the model configuration information, the model file corresponding to the type of the target handheld device includes: obtaining, from a storage path of a model resource corresponding to the type of the target handheld device, the model file corresponding to the type of the target handheld device.

Optionally, obtaining, based on the model file, the model resource data corresponding to the type of the target handheld device includes: converting the model file into a string object. The string object includes two-dimensional coordinate data, vertex data, and triangular face data. Generating, based on the model resource data, the handheld model corresponding to the target handheld device, and loading the handheld model includes: generating the handheld model corresponding to the target handheld device based on the two-dimensional coordinate data, the vertex data, and the triangular face data, and loading the handheld model.

Optionally, the method further includes, subsequent to determining whether the type of the target handheld device is the existing type in the head-mounted display device: loading, in response to the type of the target handheld device being the existing type in the head-mounted display device, the handheld model corresponding to the type of the target handheld device directly from an SDK of the head-mounted display device.

In a second aspect of the present disclosure, a model loading apparatus for a head-mounted display device is provided. The apparatus includes: a first obtaining unit configured to obtain a type of a target handheld device, the target handheld device being a handheld device connected to a current application service; a determining unit configured to determine whether the type of the target handheld device is an existing type in the head-mounted display device; a second obtaining unit configured to obtain, in response to the type of the target handheld device being not the existing type in the head-mounted display device, corresponding model resource data based on the type of the target handheld device; and a first loading unit configured to generate, based on the model resource data, a handheld model corresponding to the target handheld device, and load the handheld model.

Optionally, the second obtaining unit is specifically configured to: obtain a corresponding model file based on the type of the target handheld device, the model file being an OBJ model file; and obtain, based on the model file, the model resource data corresponding to the type of the target handheld device.

Optionally, the second obtaining unit is specifically configured to: obtain a Json file, the Json file storing a type of a handheld device and model configuration information corresponding to the type of the handheld device; obtain, from the Json file, model configuration information corresponding to the type of the target handheld device; and obtain, based on the model configuration information, the model file corresponding to the type of the target handheld device.

In a third aspect of the present disclosure, a head-mounted display device is provided. The device includes a processor, and a memory. The memory stores computer-executable instructions. The computer-executable instructions, when executed by the processor, implement any one of the above-mentioned model loading methods for the head-mounted display device.

In a fourth aspect of the present disclosure, a computer-readable storage medium is provided. The computer-readable storage medium stores one or more programs. The one or more programs, when executed by a processor, implement any one of the above-mentioned model loading methods for the head-mounted display device.

The present disclosure can provide the following beneficial effects. According to an embodiment of the present disclosure, the head-mounted display device includes the target handheld device connected to a current application. With the model loading method for the head-mounted display device according to an embodiment of the present disclosure, the type of the target handheld device is obtained in response to loading the handheld model of the target handheld device. Here, the target handheld device is the handheld device connected to the current application service. Whether the type of the target handheld device is the existing type in the head-mounted display device is determined. The corresponding model resource data is obtained based on the type of the target handheld device, in response to the type of the target handheld device being not the existing type in the head-mounted display device. The handheld model corresponding to the target handheld device is generated based on the model resource data. The handheld model is loaded. With the model loading method for the head-mounted display device according to the embodiment of the present disclosure, when a user uses a new target handheld device, a handheld model corresponding to the new target handheld device can be generated and displayed without the need for a developer to re-adapt an SDK, thereby reducing subsequent maintenance and development costs, allowing a handheld model presented in a virtual scene to be adapted to a handheld device being used by the user, and improving use experience of the user.

BRIEF DESCRIPTION OF DRAWINGS

Various other advantages and benefits will become apparent to those skilled in the art after reading the detailed description of preferred embodiments given below. The accompanying drawings are used for a purpose of illustrating the preferred embodiments only, rather than limiting the present disclosure. Moreover, throughout the accompanying drawings, same elements are denoted by same reference numerals. In the accompanying drawings.

DESCRIPTION OF EMBODIMENTS

Exemplary embodiments of the present disclosure will be described in detail below with reference to the accompanying drawings. These embodiments are provided for a more thorough understanding of the present disclosure, and can fully convey the scope of the present disclosure to those skilled in the art. While exemplary embodiments of the present disclosure are illustrated in the accompanying drawings, it should be understood that the present disclosure may be embodied in various forms and should not be construed as being limited to the embodiments set forth herein.

Figure 1:
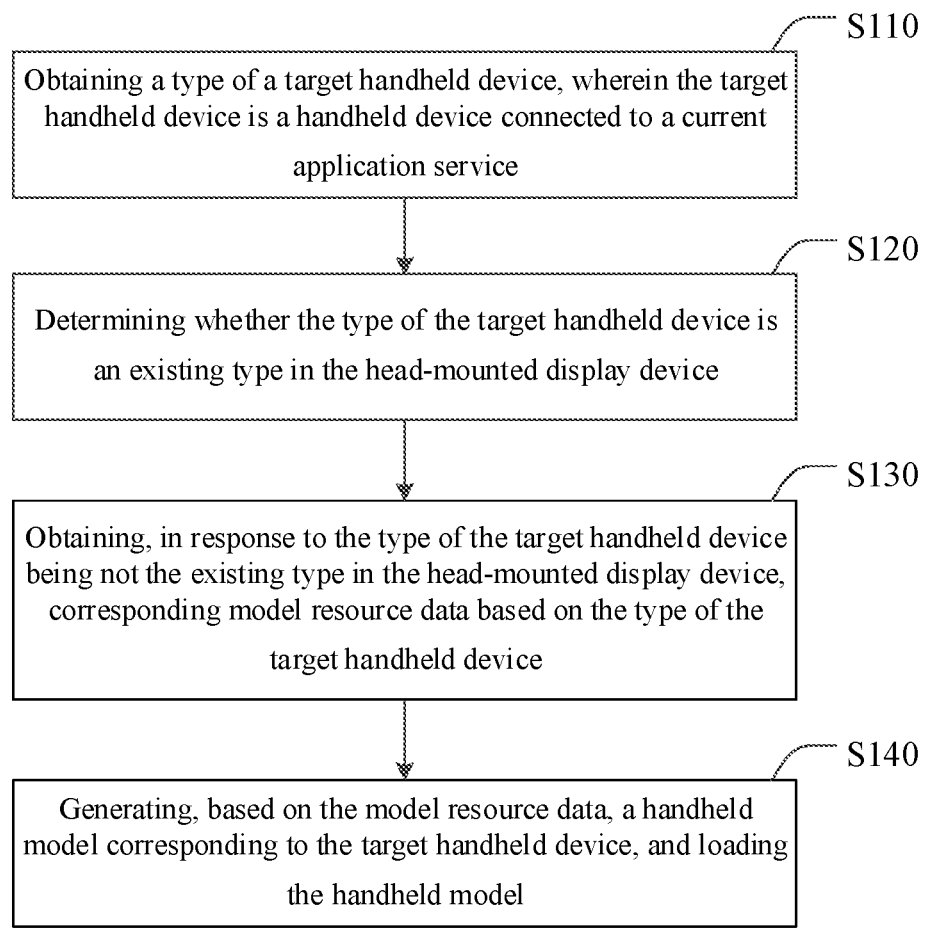
FIG. 1 is a flowchart illustrating a model loading method for a head-mounted display device according to an embodiment of the present disclosure.

FIG. 1 illustrates a flowchart illustrating a model loading method for a head-mounted display device according to an embodiment of the present disclosure. Referring to FIG. 1, the model loading method for the head-mounted display device according to the embodiment of the present disclosure includes actions at blocks S110 to S140.

At block S110, a type of a target handheld device is obtained. Here, the target handheld device is a handheld device connected to a current application service.

According to the embodiment of the present disclosure, the head-mounted display device may include a virtual reality device such as a virtual reality helmet, a pair of virtual reality glasses, etc., and the handheld device may include a joystick controller, etc. The head-mounted display device and the handheld device may be connected to each other wirelessly to achieve tangible interaction between a user and a virtual reality scene. When the user uses an application, e.g., a game application, the handheld device may establish a connection with the application.

In terms of loading a handheld model in the head-mounted display device, it is necessary to obtain, from a currently running application service, the type of the target handheld device connected to the current application service first. Here, the type of the target handheld device may be regarded as a unique identifier for distinguishing different handheld devices. Each individual handheld device has its own corresponding type.

At block S120, whether the type of the target handheld device is an existing type in the head-mounted display device is determined.

After the type of the target handheld device is obtained, whether the type of the target handheld device is the existing type in the head-mounted display device needs to be further determined. Here, the existing type may be understood as a type of a handheld device that is already included in an SDK developed for the head-mounted display device.

At block S130, corresponding model resource data is obtained based on the type of the target handheld device, in response to the type of the target handheld device being not the existing type in the head-mounted display device.

When the type of the target handheld device is not the existing type in the head-mounted display device, it means that the user is probably using a new target handheld device. A handheld model corresponding to the new target handheld device has not yet been developed and packaged in the SDK.

Therefore, it is necessary to generate a corresponding handheld model for the new target handheld device separately. In this case, model resource data required for generating the handheld model for the new target handheld device needs to be obtained.

At block S140, a handheld model corresponding to the target handheld device is generated based on the model resource data, and the handheld model is loaded.

After the model resource data is obtained, the handheld model corresponding to the target handheld device may be constructed based on the model resource data. After the handheld model is constructed, the handheld model may be loaded into a virtual scene, thereby allowing the handheld model presented in the virtual scene to be adapted to the handheld device being used by the user, and improving use experience of the user.

With the model loading method for the head-mounted display device according to the embodiment of the present disclosure, when the user uses a new target handheld device, a handheld model corresponding to the new target handheld device can be generated and displayed without the need for a developer to re-adapt the SDK, thereby reducing subsequent maintenance and development costs, allowing the handheld model presented in the virtual scene to be adapted to a handheld device being used by the user, and improving use experience of the user.

In an embodiment of the present disclosure, obtaining the corresponding model resource data based on the type of the target handheld device includes: obtaining a corresponding model file based on the type of the target handheld device, in which the model file is an OBJ model file; and obtaining, based on the model file, the model resource data corresponding to the type of the target handheld device.

According to the embodiment of the present disclosure, in terms of obtaining the model resource data corresponding to the type of the target handheld device, a model file corresponding to the type of the target handheld device may be obtained first. The model file includes various model configuration information required by the handheld model corresponding to the target handheld device, including a material, a map, a prompt box, and other configuration information used to characterize a display effect of the handheld model.

To make model configuration information editable, the above-mentioned model file is mainly in an OBJ format. A file in the OBJ format is a text file that may be opened directly with a wordpad for viewing and editing, thereby meeting different needs of the developer.

In an embodiment of the present disclosure, obtaining the corresponding model file based on the type of the target handheld device includes: obtaining a Json file, in which the Json file stores a type of a handheld device and model configuration information corresponding to the type of the handheld device; obtaining, from the Json file, model configuration information corresponding to the type of the target handheld device; and obtaining, based on the model configuration information, the model file corresponding to the type of the target handheld device.

According to the embodiment of the present disclosure, in terms of obtaining the model file, the Json file may be obtained first. Here, the Json file, which is a file storing the type of the handheld device and the model configuration information corresponding to the type of the handheld device, is used for unified management of model files of different handheld devices. A data format in the Json file may be specifically expressed as:
"controller": [{"name": "controller0", "path":"/xxx/xxx/",}, { } . . . ].

It may be seen that the Json file stores names of handheld models corresponding to different handheld devices and storage paths of model resources of the handheld models corresponding to different handheld devices. Each brace in the bracket may be regarded as attributes of one model. The names and the storage paths of the model resources are stored in an array and ranked sequentially from 0. A sequence number is in one-to-one correspondence with the type of the handheld device obtained from the current application service.

Based on the above data format in the Json file, it may be obtained from the Json file that the model configuration information corresponding to the type of the target handheld device includes a name of the handheld model and a storage path of a model resource, etc. Therefore, the model file corresponding to the type of the target handheld device may be obtained based on the model configuration information.

When a new handheld device is added, a new model file corresponding to the new handheld device may be put into a position corresponding to "path" in the Json file, and a name of the new model file may be modified to a name corresponding to "name" in the Json file.

In an embodiment of the present disclosure, the model configuration information includes a storage path of a model resource. Obtaining, based on the model configuration information, the model file corresponding to the type of the target handheld device includes: obtaining, from a storage path of a model resource corresponding to the type of the target handheld device, the model file corresponding to the type of the target handheld device.

As described above, in the embodiment of the present disclosure, the model configuration information may specifically include the storage path of the model resource. The storage path of the model resource corresponding to the type of the target handheld device characterizes a storage position of the model resource required for constructing the handheld model corresponding to the target handheld device. In this way, the model file corresponding to the type of the target handheld device may be obtained, under the storage path of the model resource corresponding to the type of the target handheld device, to be used as a basis for subsequent construction of the handheld model.

In an embodiment of the present disclosure, obtaining, based on the model file, the model resource data corresponding to the type of the target handheld device includes: converting the model file into a string object. Here, the string object includes two-dimensional coordinate data, vertex data, and triangular face data. Generating, based on the model resource data, the handheld model corresponding to the target handheld device, and loading the handheld model includes: generating the handheld model corresponding to the target handheld device based on the two-dimensional coordinate data, the vertex data, and the triangular face data, and loading the handheld model.

A scene development platform such as Unity3D is currently used to develop virtual reality scenes. Unity3D is a fully-integrated professional game engine developed and provided by Unity Technologies, making it easy for developers of virtual reality scenes to develop and create virtual reality scenes. In addition, an editor of Unity3D may run under a variety of operating systems to render virtual reality scenes.

Based on this, in the embodiment of the present disclosure Unity3D may be used to construct the new handheld model. Specifically, when Unity3D is used to construct the handheld model, StringBuilder in Unity3D may be used first to convert the obtained model file into the string object such as uv two-dimensional coordinate data, the vertex data, and the triangular face data.

Mesh, a component in Unity3D called a mesh component, refers to meshes of a model. A 3D model is made by stitching polygons together, while a polygon is actually made by stitching a plurality of triangles together. Therefore, a surface of the 3D model is actually made up of a plurality of triangular faces that are connected to each other. A set of points and edges that form these triangles in a three-dimensional (3D) space is Mesh.

Based on this, according to the embodiment of the present disclosure, a method for creating Mesh of Unit3D is adopted. The above-mentioned uv two-dimensional coordinate data, vertex data, triangular face data, and other string objects are inputted into Unit3D to generate the handheld model corresponding to the target handheld device. The handheld model is loaded and displayed in a current virtual scene for subsequent interaction with the user.

In an embodiment of the present disclosure, the method further includes, subsequent to determining whether the type of the target handheld device is the existing type in the head-mounted display device: loading, in response to the type of the target handheld device being the existing type in the head-mounted display device, the handheld model corresponding to the type of the target handheld device directly from an SDK of the head-mounted display device.

After whether the type of the target handheld device is the existing type in the head-mounted display device is determined, the target handheld device connected to the current application service is not a new handheld device in response to determining that the type of the target handheld device is the existing type in the head-mounted display device. In this case, the handheld model corresponding to the type of the target handheld device exists in an original SDK. Therefore, the handheld model of the target handheld device may be loaded from the original SDK directly.

In an embodiment of the present disclosure, the method further includes, subsequent to generating, based on the model resource data, the handheld model corresponding to the target handheld device: determining whether a handheld model is already loaded in a current virtual scene; and replacing, in response to the handheld model being already loaded in the current virtual scene, the handheld model with the handheld model corresponding to the target handheld device.

In an actual application scenario, when the handheld device currently used by the user is a new handheld device, the original SDK includes no handheld model adapted to the new handheld device. In this case, an existing handheld model in the SDK may be loaded in the virtual scene first. After a handheld model corresponding to the new handheld device is generated in accordance with the above embodiment, the handheld model already displayed in the virtual scene may be replaced by the handheld model corresponding to the new handheld device. Such a process does not take much time and therefore does not affect the use experience of the user.

Figure 2:
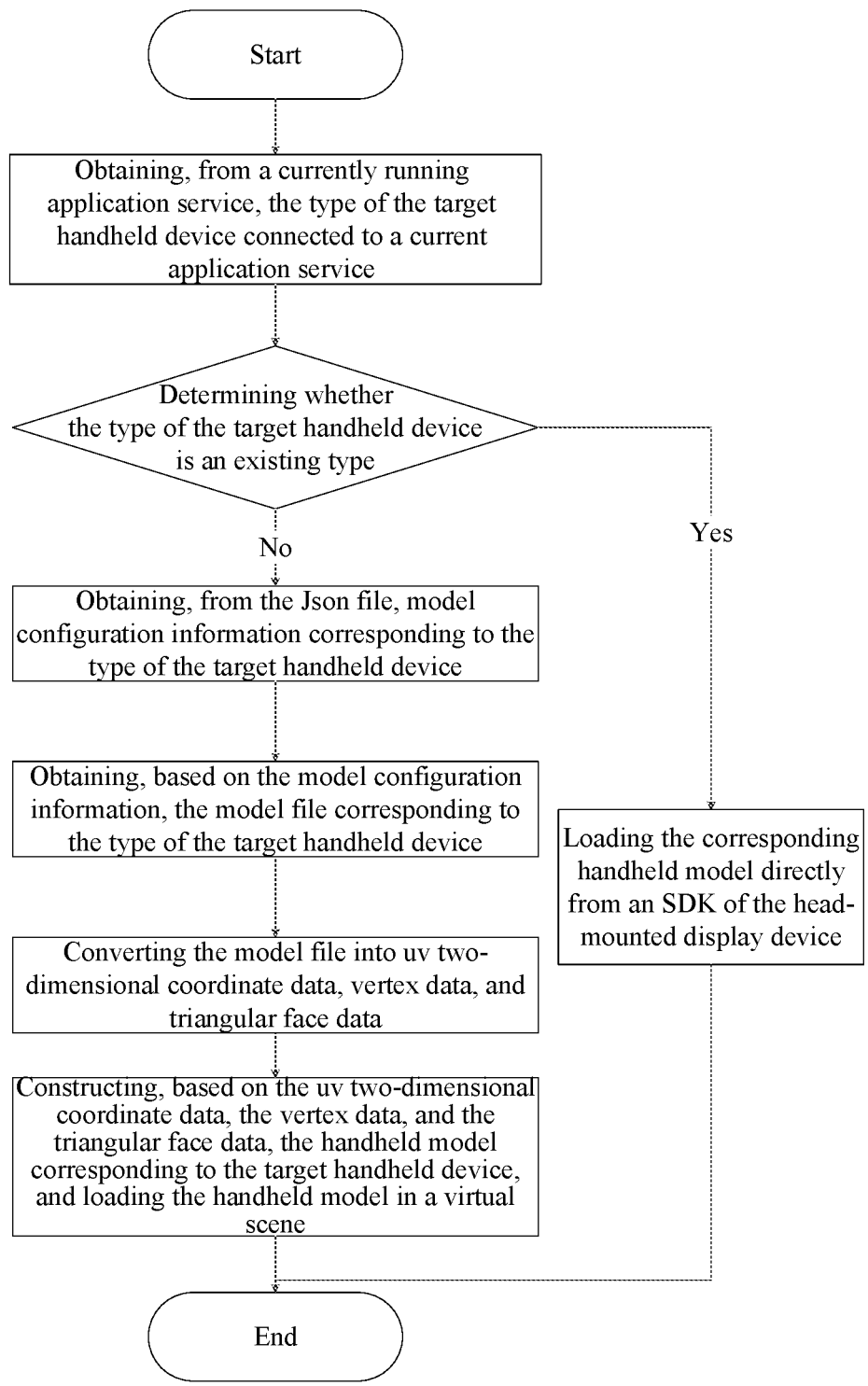
FIG. 2 is a flowchart illustrating a model loading method for a head-mounted display device according to an embodiment of the present disclosure.

For a better understanding of each embodiment of the present disclosure, reference may be made to FIG. 2. FIG. 2 provides a flowchart illustrating a model loading method for a head-mounted display device according to an embodiment of the present disclosure. Firstly, the type of the target handheld device connected to the current application service is obtained from a currently running application service. Then, whether the type of the target handheld device is the existing type in the head-mounted display device is determined. The corresponding handheld model is loaded, in response to the type of the target handheld device being the existing type in the head-mounted display device, directly from the SDK of the head-mounted display device.

The model configuration information corresponding to the type of the target handheld device is obtained, in response to the type of the target handheld device being not the existing type in the head-mounted display device, from the Json file. The model file corresponding to the type of the target handheld device is obtained based on the model configuration information. The model file corresponding to the type of the target handheld device is converted into the string object such as the uv two-dimensional coordinate data, the vertex data, and the triangular face data. The handheld model corresponding to the type of the target handheld device is constructed based on the string object such as the uv two-dimensional coordinate data, the vertex data, and the triangular face data and loaded in a currently displayed virtual scene. In this way, better virtual interaction of the user with the target handheld device can be facilitated.

Figure 3:
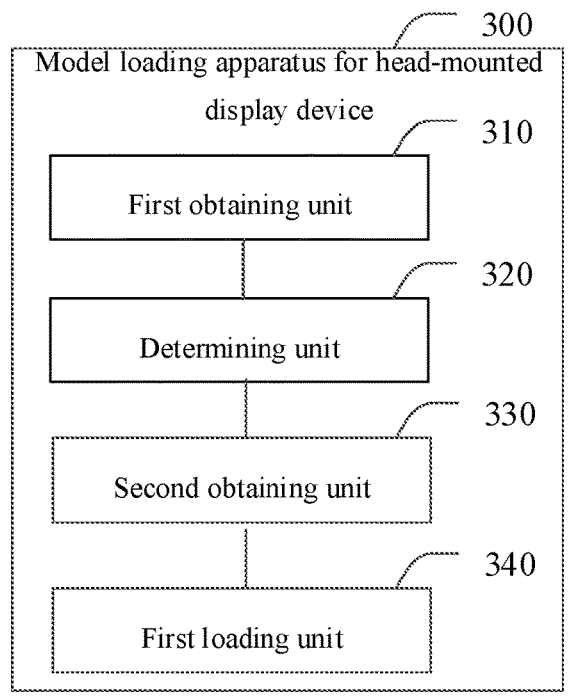
FIG. 3 is a block diagram showing a model loading apparatus for a head-mounted display device according to an embodiment of the present disclosure.

In a same technical concept as the aforementioned model loading method for the head-mounted display device, an embodiment of the present disclosure further provides a model loading apparatus for a head-mounted display device. FIG. 3 is a block diagram showing a model loading apparatus for a head-mounted display device according to an embodiment of the present disclosure. Referring to FIG. 3, a model loading apparatus 300 for a head-mounted display device according to the embodiment of the present disclosure includes a first obtaining unit 310, a determining unit 320, a second obtaining unit 330, and a first loading unit 340.

The first obtaining unit 310 is configured to obtain a type of a target handheld device. Here, the target handheld device is a handheld device connected to a current application service. The determining unit 320 is configured to determine whether the type of the target handheld device is an existing type in the head-mounted display device. The second obtaining unit 330 is configured to obtain, in response to the type of the target handheld device being not the existing type in the head-mounted display device, corresponding model resource data based on the type of the target handheld device. The first loading unit 340 is configured to generate, based on the model resource data, a handheld model corresponding to the target handheld device, and load the handheld model.

In an embodiment of the present disclosure, the second obtaining unit 330 is specifically configured to: obtain a corresponding model file based on the type of the target handheld device, in which the model file is an OBJ model file; and obtain, based on the model file, the model resource data corresponding to the type of the target handheld device.

In an embodiment of the present disclosure, the second obtaining unit 330 is specifically configured to: obtain a Json file, in which the Json file stores a type of a handheld device and model configuration information corresponding to the type of the handheld device; obtain, from the Json file, model configuration information corresponding to the type of the target handheld device; and obtain, based on the model configuration information, the model file corresponding to the type of the target handheld device.

In an embodiment of the present disclosure, the model configuration information includes a storage path of a model resource. The second obtaining unit 330 is specifically configured to obtain, from a storage path of a model resource corresponding to the type of the target handheld device, the model file corresponding to the type of the target handheld device.

In an embodiment of the present disclosure, the second obtaining unit 330 is specifically configured to convert the model file into a string object. The string object includes two-dimensional coordinate data, vertex data, and triangular face data. The first loading unit 340 is configured to generate the handheld model corresponding to the target handheld device based on the two-dimensional coordinate data, the vertex data, and the triangular face data, and load the handheld model.

In an embodiment of the present disclosure, the apparatus further includes a second loading unit. The second loading unit is configured to load, in response to the type of the target handheld device being the existing type in the head-mounted display device, the handheld model corresponding to the type of the target handheld device directly from an SDK of the head-mounted display device.

Notice should be given to the following explanation.

Figure 4:
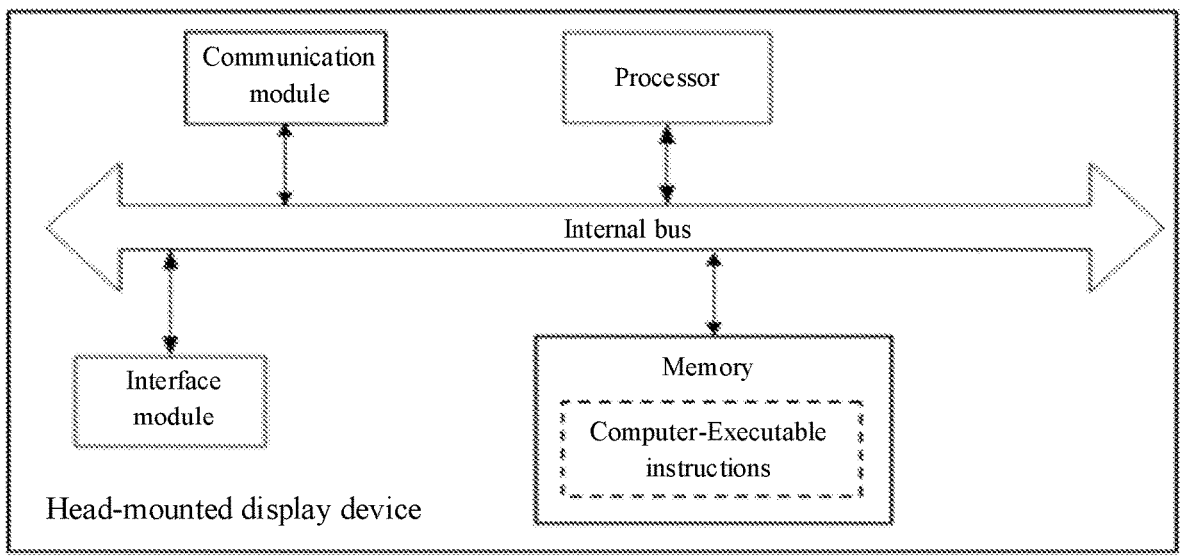
FIG. 4 is a schematic structural diagram showing a head-mounted display device according to an embodiment of the present disclosure.

FIG. 4 illustrates a schematic structural diagram showing a head-mounted display device according to an embodiment of the present disclosure. Referring to FIG. 4, at a hardware level, the head-mounted display device includes a memory and a processor. Optionally, the head-mounted display device includes an interface module, a communication module, and the like. The memory may include an internal storage, such as a cache Random-Access Memory (RAM), and may further include a non-volatile memory, e.g., at least one magnetic disk storage. Certainly, the head-mounted display device may further include other hardware required as desired.

The processor, the interface module, the communication module, and the memory may be connected to each other via an internal bus. The internal bus may be an Industry Standard Architecture (ISA) bus, a Peripheral Component Interconnect (PCI) bus, an Extended Industry Standard Architecture (EISA) bus, etc. The bus may be categorized into an address bus, a data bus, a control bus, etc. For ease of representation, only one bidirectional arrow is used in FIG. 4, but the only one bidirectional arrow does not mean that only one bus or one type of bus exists.

The memory stores computer-executable instructions. The processor may provide the computer-executable instructions to the processor via the internal bus.

The processor executes the computer-executable instructions stored in the memory and is configured to implement the following operations of: obtaining a type of a target handheld device, in which the target handheld device is a handheld device connected to a current application service; determining whether the type of the target handheld device is an existing type in the head-mounted display device; obtaining, in response to the type of the target handheld device being not the existing type in the head-mounted display device, corresponding model resource data based on the type of the target handheld device; and generating, based on the model resource data, a handheld model corresponding to the target handheld device, and loading the handheld model.

Functions performed by the above model loading apparatus for the head-mounted display device disclosed in the embodiment illustrated in FIG. 3 of the present disclosure may be applied in, or implemented by, the processor. The processor may be an integrated circuit chip having signal processing capabilities. In an implementation, actions of the above method may be accomplished by an integrated logic circuit in hardware in the processor or by instructions in the form of software. The above processor may be a general-purpose processor, including a Central Processing Unit (CPU), a Network Processor (NP), etc.; and may further be a Digital Signal Processor (DSP), an Application Specific Integrated Circuit (ASIC), a Field-Programmable Gate Array (FPGA) or other programmable logic devices, a discrete gate or a transistor logic device, and a discrete hardware component. The method, actions, and logic block diagrams according to any of the embodiments of the present disclosure may be implemented or performed. The general-purpose processor may be a microprocessor, or the processor may further be any conventional processor, etc. The actions of the method disclosed in combination with any of the embodiments of the present disclosure may be directly embodied as performed by a hardware decoding processor or performed by a combination of a hardware module and a software module in a decoding processor. The software module may be located in a random memory, a flash memory, a read-only memory, a programmable read-only memory or an electrically erasable programmable memory, a register, and other storage media mature in the art. The storage medium is located in the memory. The processor reads information in the memory and completes the actions of the above method in combination with the hardware.

The head-mounted display device may further perform the actions performed by the model loading method for the head-mounted display device in FIG. 1 and implement functions of the model loading method for the head-mounted display device according to the embodiment illustrated in FIG. 1. Details thereof will be omitted in the embodiment of the present disclosure.

A computer-readable storage medium is further provided by an embodiment of the present disclosure. The computer-readable storage medium stores one or more programs. The one or more programs, when executed by a processor, implement the aforementioned model loading method for the head-mounted display device and are specifically configured to: obtain a type of a target handheld device, in which the target handheld device is a handheld device connected to a current application service; determine whether the type of the target handheld device is an existing type in the head-mounted display device; obtain, in response to the type of the target handheld device being not the existing type in the head-mounted display device, corresponding model resource data based on the type of the target handheld device; and generate, based on the model resource data, a handheld model corresponding to the target handheld device, and load the handheld model.

Those skilled in the art should understand that the embodiments of the present disclosure can be provided as a method, a system, or a computer program product. Therefore, the present disclosure may adopt a form of a complete hardware embodiment, a complete software embodiment, or an embodiment combining software and hardware. In addition, the present disclosure may adopt a form of a computer program product implemented on one or more computer-usable storage media (including but not limited to a disk storage, a Compact Disc Read-Only Memory (CD-ROM), an optical storage, etc.) including computer-usable program codes.

The present disclosure is described with reference to flowcharts and/or block diagrams of the method, the device (system), and the computer program product according to the embodiments of the present disclosure. It should be understood that each process and/or block in the flowcharts and/or block diagrams, and a combination of processes and/or blocks in the flowcharts and/or block diagrams can be implemented by computer program instructions. These computer program instructions can be provided to a processor of a general-purpose computer, a special-purpose computer, an embedded processor, or other programmable data processing device to generate a machine, such that instructions executed by the processor of the computer or other programmable data processing devices generate an apparatus for implementing functions specified in one or more processes in the flowchart and/or one or more blocks in the block diagram.

These computer program instructions can further be stored in a computer-readable memory that can guide a computer or other programmable data processing devices to work in a specific manner, such that instructions stored in the computer-readable memory produce an article of manufacture including an instruction device. The instruction device implements functions specified in one or more processes in the flowchart and/or one or more blocks in the block diagram.

These computer program instructions can further be loaded on a computer or other programmable data processing devices to enable a series of operation steps to be executed on the computer or other programmable devices for producing computer-implemented processing, such that instructions executed on the computer or other programmable devices provide actions for implementing functions specified in one or more processes in the flowchart and/or one or more blocks in the block diagram.

In a convention configuration, a computing device includes one or more processors (e.g., CPU), an input/output interface, a network interface, and a memory.

The memory may include a non-permanent memory in the computer-readable medium, a Random-Access Memory (RAM) and/or a non-volatile memory, such as a Read-Only Memory (ROM) or a Flash Memory (lash RAM. The memory is an example of the computer-readable medium.

The computer-readable medium includes a permanent medium, a non-permanent, a movable medium, and a non-movable medium and may be used to store information by any method or technology. The information may be computer-readable instructions, a data structure, a module of a program, or other data. Examples of a storage medium for a computer include, but are not limited to, a Phase-Change Memory (PRAM), a Static RAM (SRAM), a Dynamic RAM (DRAM), other types of RAMs, a Read-Only Memory (ROM), an Electrically Erasable Programmable Read-Only Memory (EEPROM), a flash memory or other memory technologies, a Compact Disc ROM (CD-ROM), a Digital Versatile Disc (DVD) or other optical storage, a magnetic cartridge tape, a magnetic tape disk storage or other magnetic storage devices, or any other non-transmission medium. The storage medium for the computer may be used to store information that may be accessed by the computing device. As defined herein, the computer-readable medium includes no transitory media, such as a modulated data signal and a carrier wave.

Further, it should be noted that terms "comprise", "include" or any other variations thereof are meant to cover non-exclusive including, such that the process, method, goods or device including a series of elements do not only include those elements, but further include other elements that are not explicitly listed, or further include inherent elements of the process, method, goods or device. In a case that there are no more restrictions, an element qualified by the statement "comprises a . . ." does not exclude the presence of additional identical elements in the process, method, goods or device that includes the said element.

Those skilled in the art should understand that the embodiments of the present disclosure can be provided as a method, a system, or a computer program product. Therefore, the embodiments of the present disclosure may adopt a form of a complete hardware embodiment, a complete software embodiment, or an embodiment combining software and hardware. In addition, the present disclosure may adopt a form of a computer program product implemented on one or more computer-usable storage media (including but not limited to a disk storage, a CD-ROM, an optical storage, etc.) including computer-usable program codes.

While the embodiments of the present disclosure have been described above, they are not intended to limit the present disclosure. For those skilled in the art, various changes and variations can be made to the present disclosure. Any modifications, equivalent substitutions, and improvements made within the spirit and principle of the present disclosure are to be encompassed by the scope of the claims of the present disclosure.

What is claimed is:

1. A model loading method for a head-mounted display device, the method comprising:
    obtaining a type of a target handheld device, wherein the target handheld device is a handheld device connected to a current application service;
    determining whether the type of the target handheld device is an existing type in the head-mounted display device;
    obtaining, in response to the type of the target handheld device being not the existing type in the head-mounted display device, corresponding model resource data based on the type of the target handheld device; and
    generating, based on the model resource data, a handheld model corresponding to the target handheld device, and loading the handheld model.

2. The method according to claim 1, wherein said obtaining the corresponding model resource data based on the type of the target handheld device comprises:
    obtaining a corresponding model file based on the type of the target handheld device, wherein the model file is an OBJ model file; and
    obtaining, based on the model file, the model resource data corresponding to the type of the target handheld device.

3. The method according to claim 2, wherein said obtaining the corresponding model file based on the type of the target handheld device comprises:
    obtaining a Json file, wherein the Json file stores a type of a handheld device and model configuration information corresponding to the type of the handheld device;
    obtaining, from the Json file, model configuration information corresponding to the type of the target handheld device; and
    obtaining, based on the model configuration information, the model file corresponding to the type of the target handheld device.

4. The method according to claim 3, wherein the model configuration information comprises a storage path of a model resource, and said obtaining, based on the model configuration information, the model file corresponding to the type of the target handheld device comprises:
    obtaining, from a storage path of a model resource corresponding to the type of the target handheld device, the model file corresponding to the type of the target handheld device.

5. The method according to claim 2, wherein said obtaining, based on the model file, the model resource data corresponding to the type of the target handheld device comprises:

converting the model file into a string object, wherein the string object comprises two-dimensional coordinate data, vertex data, and triangular face data; and wherein said generating, based on the model resource data, the handheld model corresponding to the target handheld device, and loading the handheld model comprises:

generating the handheld model corresponding to the target handheld device based on the two-dimensional coordinate data, the vertex data, and the triangular face data, and loading the handheld model.

6. The method according to claim 1, further comprising, subsequent to said determining whether the type of the target handheld device is the existing type in the head-mounted display device:

loading, in response to the type of the target handheld device being the existing type in the head-mounted display device, the handheld model corresponding to the type of the target handheld device directly from a Software Development Kit (SDK) of the head-mounted display device.

7. A model loading apparatus for a head-mounted display device, the apparatus comprising:

a first obtaining unit configured to obtain a type of a target handheld device, wherein the target handheld device is a handheld device connected to a current application service;

a determining unit configured to determine whether the type of the target handheld device is an existing type in the head-mounted display device;

a second obtaining unit configured to obtain, in response to the type of the target handheld device being not the existing type in the head-mounted display device, corresponding model resource data based on the type of the target handheld device; and a first loading unit configured to generate, based on the model resource data, a handheld model corresponding to the target handheld device, and load the handheld model.

8. The apparatus according to claim 7, wherein the second obtaining unit is configured to:

obtain a corresponding model file based on the type of the target handheld device, wherein the model file is an OBJ model file; and obtain, based on the model file, the model resource data corresponding to the type of the target handheld device.

9. The apparatus according to claim 8, wherein the second obtaining unit is configured to:

obtain a Json file, wherein the Json file stores a type of a handheld device and model configuration information corresponding to the type of the handheld device;

obtain, from the Json file, model configuration information corresponding to the type of the target handheld device; and obtain, based on the model configuration information, the model file corresponding to the type of the target handheld device.

10. The apparatus according to claim 9, wherein the model configuration information comprises a storage path of a model resource, and the second obtaining unit is further configured to:

obtain, from a storage path of a model resource corresponding to the type of the target handheld device, the model file corresponding to the type of the target handheld device.

11. The apparatus according to claim 8, wherein the second obtaining unit is further configured to:

convert the model file into a string object, wherein the string object comprises two-dimensional coordinate data, vertex data, and triangular face data; and wherein the first loading unit is further configured to:

generate the handheld model corresponding to the target handheld device based on the two-dimensional coordinate data, the vertex data, and the triangular face data, and load the handheld model.

12. The apparatus according to claim 7, further comprising a second loading unit configured to:

load, in response to the type of the target handheld device being the existing type in the head-mounted display device, the handheld model corresponding to the type of the target handheld device directly from a Software Development Kit (SDK) of the head-mounted display device.

13. A head-mounted display device, comprising:

a processor; and a memory having computer-executable instructions stored thereon, wherein the computer-executable instructions, when executed by the processor, cause the head-mounted display device to:

obtain a type of a target handheld device, wherein the target handheld device is a handheld device connected to a current application service;

determine whether the type of the target handheld device is an existing type in the head-mounted display device;

obtain, in response to the type of the target handheld device being not the existing type in the head-mounted display device, corresponding model resource data based on the type of the target handheld device; and generate, based on the model resource data, a handheld model corresponding to the target handheld device, and loading the handheld model.

14. The head-mounted display device according to claim 13, wherein said obtaining the corresponding model resource data based on the type of the target handheld device comprises:

obtaining a corresponding model file based on the type of the target handheld device, wherein the model file is an OBJ model file; and obtaining, based on the model file, the model resource data corresponding to the type of the target handheld device.

15. The head-mounted display device according to claim 14, wherein said obtaining the corresponding model file based on the type of the target handheld device comprises:

obtaining a Json file, wherein the Json file stores a type of a handheld device and model configuration information corresponding to the type of the handheld device;

obtaining, from the Json file, model configuration information corresponding to the type of the target handheld device; and obtaining, based on the model configuration information, the model file corresponding to the type of the target handheld device.

16. The head-mounted display device according to claim 15, wherein the model configuration information comprises a storage path of a model resource, and said obtaining, based on the model configuration information, the model file corresponding to the type of the target handheld device comprises:
  obtaining, from a storage path of a model resource corresponding to the type of the target handheld device, the model file corresponding to the type of the target handheld device.

17. The head-mounted display device according to claim 14, wherein said obtaining, based on the model file, the model resource data corresponding to the type of the target handheld device comprises:
  converting the model file into a string object, wherein the string object comprises two-dimensional coordinate data, vertex data, and triangular face data; and wherein said generating, based on the model resource data, the handheld model corresponding to the target handheld device, and loading the handheld model comprises:
  generating the handheld model corresponding to the target handheld device based on the two-dimensional coordinate data, the vertex data, and the triangular face data, and loading the handheld model.

18. The head-mounted display device according to claim 13, wherein the computer-executable instructions, when executed by the processor, further cause the head-mounted display device to, subsequent to said determining whether the type of the target handheld device is the existing type in the head-mounted display device:
  load, in response to the type of the target handheld device being the existing type in the head-mounted display device, the handheld model corresponding to the type of the target handheld device directly from a Software Development Kit (SDK) of the head-mounted display device.

* * * * *